United States Patent [19]

Lock

[11] Patent Number: 5,078,010

[45] Date of Patent: Jan. 7, 1992

[54] INDUCTANCE LEVEL SENSING DEVICE

[75] Inventor: Graham D. Lock, Colchester, United Kingdom

[73] Assignee: Emhart Inc., Newark, Del.

[21] Appl. No.: 568,490

[22] Filed: Aug. 16, 1990

[30] Foreign Application Priority Data

Sep. 6, 1989 [GB] United Kingdom ............... 8920130

[51] Int. Cl.⁵ ..................... G01F 23/18; G01N 27/72
[52] U.S. Cl. .................................. 73/304 R; 222/64; 331/65; 324/236
[58] Field of Search ............. 73/290 R, 304 R; 324/236, 207.16; 222/64; 336/130

[56] References Cited

U.S. PATENT DOCUMENTS

| | | | |
|---|---|---|---|
| 3,962,919 | 6/1976 | Playfoot et al. | 73/290 R |
| 4,165,641 | 8/1979 | Pomerantz et al. | 73/290 R |
| 4,816,759 | 3/1989 | Ames et al. | 324/236 |
| 4,876,504 | 10/1989 | Blake et al. | 324/204 |
| 5,001,424 | 3/1991 | Kellett et al. | 324/204 F |

Primary Examiner—Daniel M. Yasich
Attorney, Agent, or Firm—Spencer T. Spencer

[57] ABSTRACT

A sensor for sensing the level of adhesive medium in a dispensing device, which sensor comprises; (a) a coil which is adapted to surround a dispensing device for dispensing adhesive medium at an adhesive dispensing station; (b) means for connecting the coil to the input of an oscillator; (c) detector means for detecting the frequency of the output of the coil; (d) conversion means to perform a frequency to voltage conversion on the varying frequency detected at the detector means (c); (e) analogue to digital conversion means to convert the signal from the frequency to voltage conversion means (d) into a form which can be compared with a calibration scale obtained by measuring the signals generated at the output of the coil, when the coil is surrounding a dispensing device containing at least two different known quantities of adhesive medium; and (f) display means for displaying the result of this comparison. The sensor can give information to the machine operator as to when the adhesive is about to run out, or to indicate how many more bonding cycles can be performed before the dispensing device has to be replaced or refilled.

2 Claims, 1 Drawing Sheet

INDUCTANCE LEVEL SENSING DEVICE

BACKGROUND OF THE INVENTION

The present invention relates to an improved sensor for sensing the level of adhesive in a dispenser for the dispensing of adhesive for a surface mount pick and place machine for mounting electronic components on a printed circuit board. The invention further relates to an improvement in the method of sensing the level of adhesive medium in a dispensing device.

In a surface mount pick and place machine, components are placed accurately and at high speed on a printed circuit board. Known pick and place machines include an adhesive dispensing station, typically mounted adjacent to a placement head; in the case of automatic machines, this adhesive dispensing station can be programmed to provide both single and multiple dot patterns of adhesive.

In both automatic and manual machines where the adhesive used is an epoxy based adhesive, the epoxy is dispensed from a syringe. It is important for the operator to know when the supply of epoxy is exhausted, or about to be exhausted, so that the bonding cycle can be interrupted and the exhausted syringe be replaced or refilled. Known epoxy dispensing syringes are provided with a metal disc which is located in the syringe on top of the reserve of adhesive. As the adhesive is used up, and its level in the syringe falls, the level of the disc falls. A magnetic reed switch is arranged so that it is switched off by the disc as it passes a predetermined position. This arrangement has the disadvantage that is is only a "go/no-go" device, with no analog feedback. This means that the operator has no information as to when the adhesive is about to run out, and no indication of the amount of adhesive remaining in the syringe at a time before the reed switch has been switched, and hence the operator cannot determine how many more bonding cycles can be performed before the syringe has to be replaced or refilled.

It is an object of the present invention to provide a sensor for sensing the level of adhesive medium in a dispensing device in which the above disadvantages are reduced or substantially obviated.

It is a further object of the present invention to provide a method for sensing the level of adhesive medium in a dispensing device in which the above disadvantages are reduced or substantially obviated.

BRIEF SUMMARY OF THE INVENTION

The present invention provides a sensor for sensing the level of adhesive medium in a dispensing device, which sensor comprises;

(a) a coil which is adapted to surround a dispensing device for dispensing adhesive medium at an adhesive dispensing station;

(b) means for connecting the coil to the input of an oscillator;

(c) detector means for detecting the frequency of the output of the coil;

(d) conversion means to perform a frequency to voltage conversion on the varying frequency detected at the detector means (c);

(e) analogue to digital conversion means to convert the signal from the frequency to voltage conversion means (d), into a form which can be compared with a calibration scale obtained by measuring the signals generated at the output of the coil, when the coil is surrounding a dispensing device containing at least two different known quantities of adhesive medium; and (f) display means for displaying the results of this comparison.

The conversion means (d) of the sensor according to the invention preferably comprises a phase locked loop circuit.

The sensor preferably further comprises an amplifier which amplifies the output signal from the frequency-to-voltage converter (d), and the amplified signal is then fed to the analogue to digital converter (e).

The invention further provides a method for sensing the level of an adhesive medium in a dispensing device, which comprises the steps of;

(i) surrounding the dispensing device with a coil;

(ii) using the coil as the frequency determining component of an oscillator;

(iii) detecting the frequency of the output of the coil at at least two different known levels of adhesive, in order to calibrate the coil;

(iv) detecting the frequency of the output of the coil at the level of adhesive which is required to be sensed;

(v) comparing the frequency detected in step (iv) with the calibration of step (iii); and (vi) calculating the level of adhesive in the dispensing device.

The frequency detected at (iii) for at least two known levels of adhesive, and the frequency detected at (iv) corresponding to the level of adhesive to be sensed, are preferably put through a frequency to voltage converter, in particular a phase locked loop (PLL) circuit. The output from the PLL circuit is then preferably amplified, and the optionally amplified signal is then preferably fed to an analogue to digital converter, the output of which is preferably read by a microprocessor.

The sensor and the method according to the invention are based on the fact that the frequency of oscillations within a coil is related to the permeability of the core of the coil. As the level of adhesive in the dispenser changes, so does the permeability of the core, leading to a change in the frequency of the oscillations within the coil.

DETAILED DESCRIPTION

Figure 1:
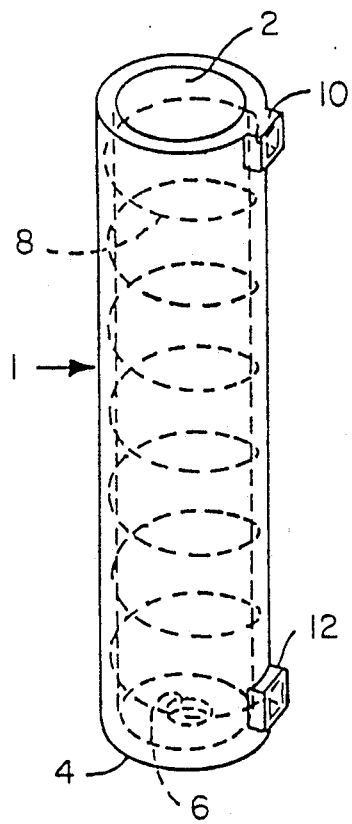
FIG. 1 is a view of a coil for use in a sensor according to the invention.

As can be seen from FIG. 1, a plastics sheath 1 is in the form of a tube, with a first open end 2 and a second end 4 which is partially closed leaving a central hole 6 of smaller diameter than the tube. A coil 8 of wire is embedded in the plastics sheath 1. Connections 10 and 12 connect the coil 8 to the rest of the oscillator circuit (the entire oscillator circuit is schematically shown in FIG. 2 as 2.1)

Figure 2:
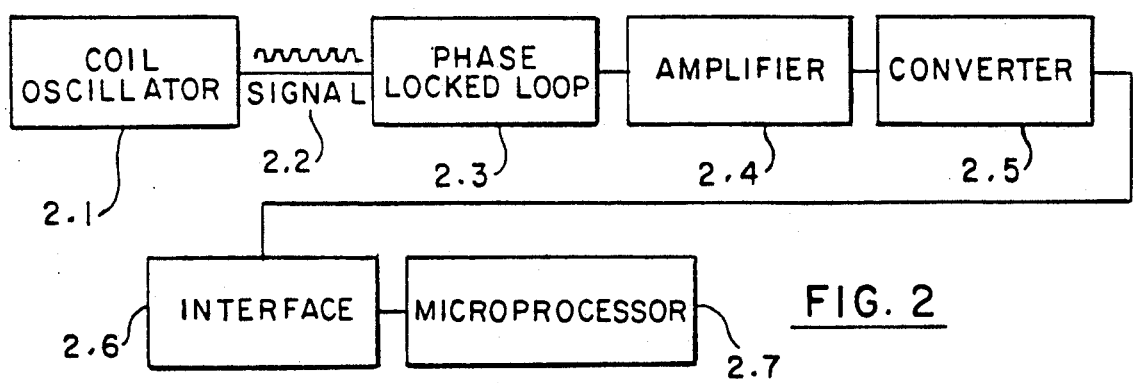
FIG. 2 is a block diagram of a circuit for sensing the level of adhesive in a dispensing device.

As can be seen from FIG. 2, the coil oscillator circuit 2.1 generates a signal 2.2 of varying frequency. An adhesive dispenser is fitted into the center of the coil of the circuit 2.1, to form the core. The signal 2.2 is fed to a phase locked loop circuit 2.3 which performs the conversion from frequency to voltage. Since the output range from the circuit 2.3 is quite small, typically of the order of 30 mVolts, it is necessary to amplify this output. Where the output ranges from Vmin to Vmax, the output siqnal is amplified at the amplifier 2.4 while referenced to Vmin. In practice, for example where the output range is typically of the order of 30 mV, the minimum voltage Vmin would be 5 volts and the maximum voltage Vmax would be 5.03 volts. For analogue to digital conversion in the converter 2.5, a range of about 2.5 volts is required. The signal from 2.3 is fed into a difference amplifier 2.4 with 5 volt signal on the second input, and amplified 80 times. This will give an output range of 0 volts to 2.4 volts, which is then fed into the analogue to digital converter 2.5. The digital output of the converter 2.5 is fed via an interface 2.6 to a microprocessor 2.7.

Figure 3:
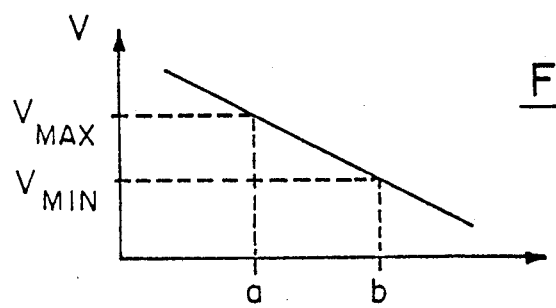
FIG. 3 is a graph of the voltage against frequency curve derived from the frequency to voltage converter.

As is shown in FIG. 3, the signal 2.2 of varying frequency fed to the frequency to voltage converter 2.3 is converted to a voltage output. The frequency a corresponds to the frequency of the coil when the tube of adhesive is full, and is converted to the maximum voltage Vmax. The frequency b corresponds to the frequency of the coil when the tube of adhesive is empty, and is converted to the minimum voltage Vmin.

In operation, a dispenser in the form of a syringe containing adhesive medium is inserted into the sheath 1, from the open end 2, with its nozzle protruding through the hole 6.

The microprocessor 2.7 can be programmed to indicate to the operator when the supply of adhesive is about to run out, or to give an indication of how many more bonding cycles can be carried out before the supply has to be replaced or refilled.

The sensor and method according to the invention are particularly suitable for use when the adhesive is an epoxy adhesive.

The sensor according to the invention can be used using differently sized dispensers, with correspondingly differently sized sheaths.

In surface mount machines, the adhesive dispensers used are typically syringes having capacities of 10 ml, 20 ml or 35 ml. In the case of a 10 ml syringe, the sheath has an internal diameter of approximately 18 mm and a length of approximately 75 mm. For a 20 ml syringe, the sheath has an internal diameter of approximately 20 mm and a length of approximately 95 mm, and for a 35 ml syringe, the sheath has an internal diameter of approximately 25 mm and a length of approximately 105 mm. The coils embedded within the different sheaths are manufactured to have the same inductance, independent of size. This is achieved by using an appropriate gauge of wire and number of turns. Although nominally of the same inductance, fine tuning is used for the different coils.

I claim:

1. A sensor for sensing the level of adhesive in an adhesive dispensing tube comprising
   a vertically oriented support tube for receiving the adhesive dispensing tube,
   coil oscillator means including a coil located within said support tube and extending from the top to the bottom thereof for generating a signal having a frequency representative of the amount of adhesive in the adhesive dispensing tube,
   means for converting said generated frequency signal to an analog voltage signal,
   means for converting said analog voltage signal to a digital signal and
   means for converting said digital signal to operator useful information.

2. A sensor according to claim 1, wherein the adhesive is an epoxy adhesive.

* * * * *